United States Patent [19]

Hayes et al.

[11] Patent Number: 5,707,684

[45] Date of Patent: *Jan. 13, 1998

[54] METHOD FOR PRODUCING MICRO-OPTICAL COMPONENTS

[75] Inventors: Donald J. Hayes; W. Royall Cox, both of Plano, Tex.

[73] Assignee: MicroFab Technologies, Inc., Plano, Tex.

[*] Notice: The term of this patent shall not extend beyond the expiration date of Pat. No. 5,498,444.

[21] Appl. No.: 714,055

[22] PCT Filed: Feb. 28, 1995

[86] PCT No.: PCT/US95/02480

§ 371 Date: Aug. 27, 1996

§ 102(e) Date: Aug. 27, 1996

[87] PCT Pub. No.: WO95/23037

PCT Pub. Date: Aug. 31, 1995

Related U.S. Application Data

[63] Continuation-in-part of Ser. No. 202,939, Feb. 28, 1994, Pat. No. 5,498,444.

[51] Int. Cl.$^6$ ............................................. B05D 5/06
[52] U.S. Cl. ................. 427/162; 427/163.2; 427/256; 427/279; 427/385.5; 427/389.7; 427/226
[58] Field of Search .................. 427/162, 163.2, 427/256, 279, 282, 385.5, 389.7, 553, 554, 375, 226

[56] References Cited

U.S. PATENT DOCUMENTS

| | | | |
|---|---|---|---|
| 2,481,620 | 9/1949 | Rosenthal | 158/77 |
| 3,476,291 | 11/1969 | Glaser | 222/76 |
| 3,900,034 | 8/1975 | Katz et al. | 128/295 |
| 4,337,886 | 7/1982 | King et al. | 228/263 B |
| 4,418,354 | 11/1983 | Perduijn | 346/140 R |
| 4,423,120 | 12/1983 | Paulus et al. | 428/614 |
| 4,460,904 | 7/1984 | Oszczakiewicz et al. | 364/75 |
| 4,461,294 | 7/1984 | Baron | 128/303.1 |
| 4,485,386 | 11/1984 | Dagna et al. | 346/75 |
| 4,522,903 | 6/1985 | Heiart et al. | 430/22 |
| 4,527,717 | 7/1985 | Emoto et al. | 222/593 |
| 4,600,424 | 7/1986 | Flaming | 65/29 |
| 4,682,187 | 7/1987 | Martner | 346/148 R |
| 4,695,527 | 9/1987 | Geissler et al. | 430/256 |
| 4,776,868 | 10/1988 | Trotter et al. | 427/162 |
| 4,812,856 | 3/1989 | Wallace | 346/1.1 |
| 4,828,886 | 5/1989 | Hieber | 427/422 |
| 4,832,024 | 5/1989 | Boussignac et al. | 128/303.1 |
| 4,853,317 | 8/1989 | Hayes | 430/318 |
| 4,891,043 | 1/1990 | Zeimer et al. | 604/210 |
| 5,024,726 | 6/1991 | Fujiwara | 427/162 |
| 5,053,100 | 10/1991 | Hayes et al. | 156/294 |
| 5,090,609 | 2/1992 | Nakao et al. | 228/123 |
| 5,092,864 | 3/1992 | Hayes et al. | 606/10 |
| 5,193,738 | 3/1993 | Hayes | 228/180.2 |
| 5,196,241 | 3/1993 | Burke et al. | 427/444 |
| 5,208,980 | 5/1993 | Hayes | 29/890.1 |
| 5,227,813 | 7/1993 | Pies et al. | 346/140 R |
| 5,229,016 | 7/1993 | Hayes et al. | 222/590 |
| 5,235,352 | 8/1993 | Pies et al. | 346/140 R |
| 5,324,623 | 6/1994 | Tsumori | 430/321 |
| 5,345,256 | 9/1994 | Stortz | 347/20 |
| 5,365,645 | 11/1994 | Walker et al. | 29/25.35 |
| 5,373,314 | 12/1994 | Everett et al. | 347/71 |
| 5,400,064 | 3/1995 | Pies et al. | 347/68 |

(List continued on next page.)

*Primary Examiner*—Janyce Bell
*Attorney, Agent, or Firm*—Locke Purnell Rain Harrell

[57] ABSTRACT

A method for direct printing of micro-optical components (82) onto optical substrates (84) or active devices to create optical circuit elements as well as micro-optical components and systems, such as plano-convex circular, cylindrical or square lenslets, anamorphic lenslets, waveguides, couplers, mixers and switches and monolithic lenses deposited directly onto optical components such as diode lasers and optical fibers. The method provides a means for precisely depositing a wide range of materials in a wide variety of shapes for fabricating a full range of passive and active micro-optic devices.

4 Claims, 10 Drawing Sheets

U.S. PATENT DOCUMENTS

| | | | |
|---|---|---|---|
| 5,402,162 | 3/1995 | Fusting et al. | 346/140 R |
| 5,406,319 | 4/1995 | Hayes et al. | 347/71 |
| 5,414,916 | 5/1995 | Hayes | 29/25.35 |
| 5,426,455 | 6/1995 | Williamson et al. | 347/10 |
| 5,430,470 | 7/1995 | Stortz | 347/54 |
| 5,433,809 | 7/1995 | Pies et al. | 156/268 |
| 5,435,060 | 7/1995 | Hayes et al. | 29/890.1 |
| 5,436,648 | 7/1995 | Stortz et al. | 347/10 |
| 5,444,467 | 8/1995 | Stortz | 347/12 |
| 5,498,444 | 3/1996 | Hayes | 427/162 |

METHOD FOR PRODUCING MICRO-OPTICAL COMPONENTS

CROSS REFERENCE TO RELATED APPLICATIONS

This application is a continuation-in-part of application Ser. No. 08/202,939 filed Feb. 28, 1994, now U.S. Pat. No. 5,498,444 which issued on Mar. 12, 1996.

STATEMENT AS TO RIGHTS TO INVENTIONS MADE UNDER FEDERALLY-SPONSORED RESEARCH AND DEVELOPMENT

This invention was made with U.S. Government support under Contract #F29601-94-C-0072 awarded by the United States Air Force. The U.S. government has certain rights to the invention.

BACKGROUND OF THE INVENTION

1. Field of the Invention

The present invention relates in general to a method for producing micro-optical components. More particularly, it relates to a method for dispensing very small and precise amounts of optical materials for producing micro-optical components.

2. Description of the Prior Art

The increasing demands in miniaturization and parallel processing of optoelectronic devices and the maturity of the process technologies in micron-scale fabrication have pushed forward the development of microlenses and other micro-optical components. According to the lens performance principles utilized, the various types of microlenses developed to date can be categorized as refractive lenses, diffractive lenses or mixed refractive/diffractive lenses. Refractive lenses bend or focus a light beam by rules of geometric optics. Diffractive lenses alter the path of light based on Fourier optics. Mixed refractive/diffractive lenses typically include refractive lenses having the surface thereof textured with diffracting patterns to correct for chromic aberrations.

Current techniques for fabricating micro-optic components include fiber end-surface etching; fiber tip etching and melting; laser micromachining; fiber drawing; polymer island melting; localized UV radiated and heated photothermal glass; ion-beam etching of Si; ion-beam etching of InP; chemical etching of InP; graded index finishing techniques such as ion exchange in glass from molten salt, swelling the surface of glass, chemical vapor deposition of $SiH_4$ and NO, and ion-beam sputtering of Si—O—N; and binary optics techniques including the use of 2-step Fresnel phase plates, 8-step Fresnel phase plates and blazed reflection grooves.

Small scale lenses offer performance advantages in faster optics and reduced aberrations. Individual lenses formed on the tips of optical fibers and on diode lasers in addition to arrays of lenses, have been demonstrated with reasonable performance characteristics, particularly for coupling into or out of fibers, detectors and diode lasers. Arrays of refractive lenslets have been used to provide efficient coupling of arrays of energy sources to amplifier and detector arrays or to bundles of optical fibers. In addition, telescopes, waveguides, couplers, relays, and spot generators incorporating small scale lenses have been investigated. Materials which have been used for forming such small scale lenses include glass, silicon, indium phosphide, polymers including amorphous Teflon® and plastics.

The production of such microlenses, however, has been severely limited by the above-mentioned techniques. The present invention provides a solution to various prior art drawbacks and deficiencies including the lack of flexibility in micro-optics manufacture and the inability to print micro-optical components directly onto optical substrates and devices.

SUMMARY OF THE INVENTION

The present invention is directed to a method for direct printing of micro-optical components onto optical substrates or active devices to create optical circuit elements as well as micro-optical components and systems, such as plano-convex circular, cylindrical or square lenslets, anamorphic lenslets, waveguides, couplers, mixers and switches and monolithic lenses deposited directly onto optical components such as diode lasers and optical fibers.

The method of the present invention involves the application of data driven ink-jet droplet dispensing technology to form and place microscopic droplets of optical materials to create micro-optical components for use with diode lasers and amplifiers. The method of the present invention also involves the delivery of droplets of optical materials directly onto the output facets of diode lasers to improve their performance and onto optical substrates to form arrays of high numerical aperture microlenses for coupling arrays of diode lasers, amplifiers and optical fibers.

The method of the present invention further involves the placement of lenslets onto the ends of optical fibers and fabrication of active micro-optical components, such as micro-lasers for high spectral purity or femtosecond applications.

The method of the present invention provides a means for precisely depositing a wide range of materials in a wide variety of shapes for fabricating a full range of passive and active micro-optic devices.

The ink-jet printing methods of the present invention provide a means for data-driven fabrication of micro-optical elements such as refractive lenslet arrays, multimode waveguides and microlenses deposited onto the tips of optical fibers. The materials that can be used for microjet printing of micro-optics include optical adhesives and index-tuned thermoplastic formulations. By varying such process parameters as numbers and locations of deposited microdroplets, print head temperature and orifice size, and target substrate temperature and surface wettability, arrays of spherical and cylindrical plano-convex microlenses can be fabricated with dimensions ranging from 80 μm to 1 mm to precision levels of just a few microns, along with multimode channel waveguides. An optical telescope system yielding optical performance data such as lenslet f/#'s and far-field patterns along with beam-steering agility data can be assembled from microlens arrays printed according to the method of the present invention.

BRIEF DESCRIPTION OF THE DRAWINGS

Other advantages and features of the invention will become more apparent with reference to the following detailed description of presently preferred embodiments thereof in connection with the accompanying drawings, wherein like reference numerals have been applied to like elements, in which.

DESCRIPTION OF THE PREFERRED EMBODIMENT

Figure 1:
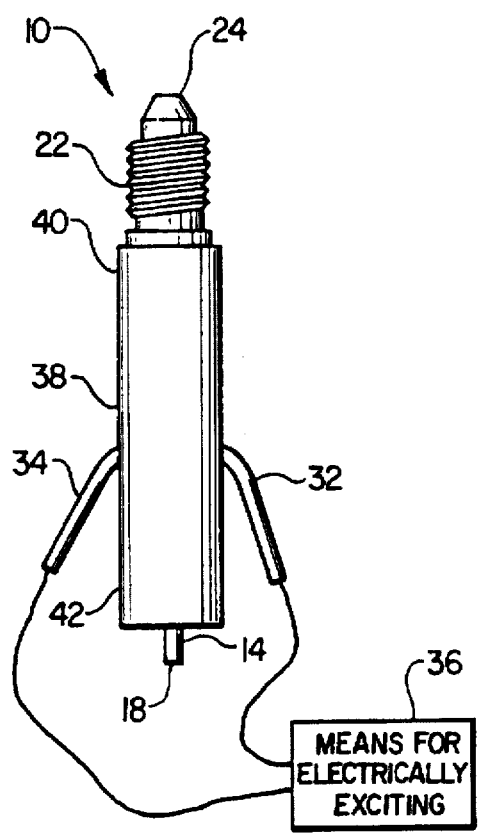
FIG. 1 is a simplified side elevational view of an ejection head of a device for dispensing very small and precise amounts of optical materials for producing micro-optical components according to the method of the present invention.
Figure 2:
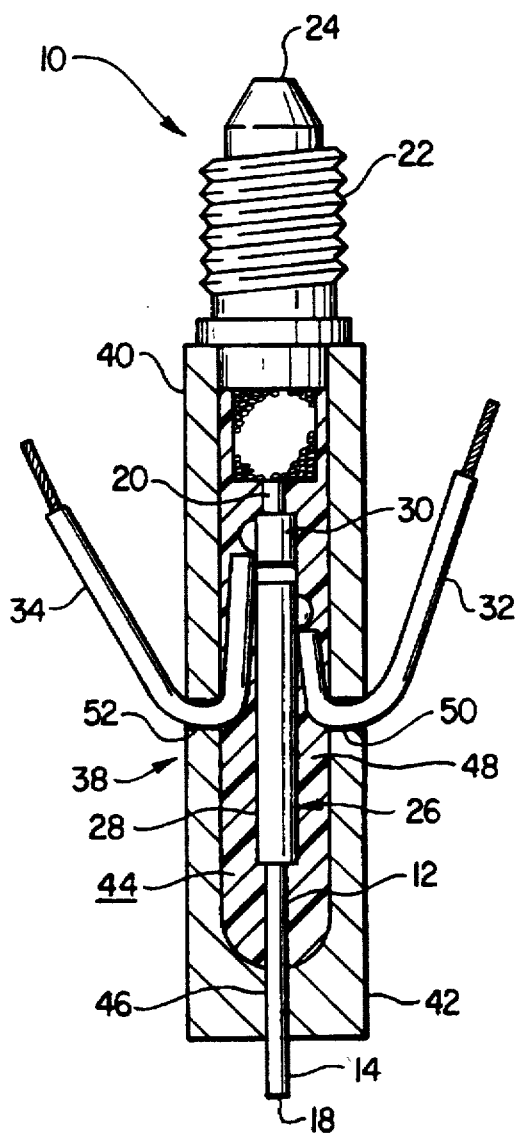
FIG. 2 is a simplified side elevational view of an ejection head of a device, with portions thereof cut away, for dispensing very small and precise amounts of optical materials for producing micro-optical components according to the method of the present invention.

Referring to the drawing and FIGS. 1 and 2 in particular, shown therein and generally designated by the reference character 10 is an ejection head or microjet for and capable of ejecting drops of optical material for forming micro-optical components. Ejection heads or microjets 10 are capable of dispensing drops having a diameter as small as about 8 μm to drops having a diameter as large as about 300 μm. For purposes of this application, the term "optical material" shall mean UV-curable adhesives, UV-curable resins, glasses, amorphous polytetrafluoroethylene such as Teflon® which is commercially available from E.I. DuPont de Nemours, plastics, translucent polymers, solvenated polymers, polymers with active materials such as dyes, sol-gel materials, optical waxes, optical epoxies, optical plastics and optical polymers. Preferably, the ejection head 10 provides precise volumetric control and most preferably, such volumetric control is within ±2%.

Ejection head or microjet 10 comprises a first housing 12 of predetermined length and predetermined diameter. First end 14 of first housing 12 is formed with an orifice 18 ranging from about 8 μm to about 300 μm in diameter. Second end 20 of first housing 12 is operatively connected to connector means 22. Connector means 22 is configured to allow tubing to be removably attached thereto for supplying liquid optical material to first housing 12. It will be appreciated that aperture 24, which extends for the entire length of connector means 22, is operatively connected to the second end 20 of first housing 12. In a preferred embodiment, first housing 12 is tubular and is formed from glass.

As shown in FIG. 2, a driver device 26 in the form of a housing is positioned in operative contact around first housing 12. Driver device 26 comprises an outer portion 28 and an inner portion 30, both of which are formed of a metallic substance. Electrical leads 32 and 34 are operatively connected to outer portion 28 and inner portion 30, respectively, and means 36 for electrically exciting or activating comprises a device for providing electrical pulses together with interface electronics. Driver device 26 comprises any device for generating a pressure wave in first housing 12 to force a predetermined amount of liquid optical material through the first housing 12 to orifice 18. Suitable driver devices 26 according to the present invention include transducers such as piezoelectric, electrostrictive, magnetostrictive or electromechanical transducers. Those of ordinary skill in the art will recognize that while the driver device 26 is shown as a tubular element, the driver device 26 may be formed in any suitable shape.

According to certain embodiments of the present invention, the first housing 12 must be heated at temperatures up to 1100° to maintain the optical material supplied to the housing 12 in a liquid state. In such cases, the driver device 26 may be located outside the heating zone and coupled to the ejection head 10 through mechanical couplers.

Second housing 38 has a first end 40 and a second end 42. Second housing 38 is positioned in a surrounding coaxial relationship to first housing 12 and is spaced therefrom to form a cavity 44 therebetween. First end 40 is operatively attached to connector means 22 while second end 42 is operatively attached to first end 14 of first housing 12 by adhesive material 46. Cavity 44 is filled with potting material 48 which is electrically insulative. Electrical leads 32 and 34 pass through apertures 50 and 52, respectively, in the wall of Second housing 38. The primary purpose of second housing 38 is to protect first housing 12 from any external physical forces. In a preferred embodiment, second housing 38 is tubular and is formed of a metallic or hard plastic material. Those of ordinary skill in the art will recognize that while the second housing 38 is shown as a tubular element, the second housing 38 may be formed in any suitable shape.

Further details concerning ejection heads and microjets such as those shown in FIGS. 1 and 2 may be found in U.S.

Pat. No. 5,092,864, the entire disclosure of which is hereby incorporated by reference.

Figure 3:
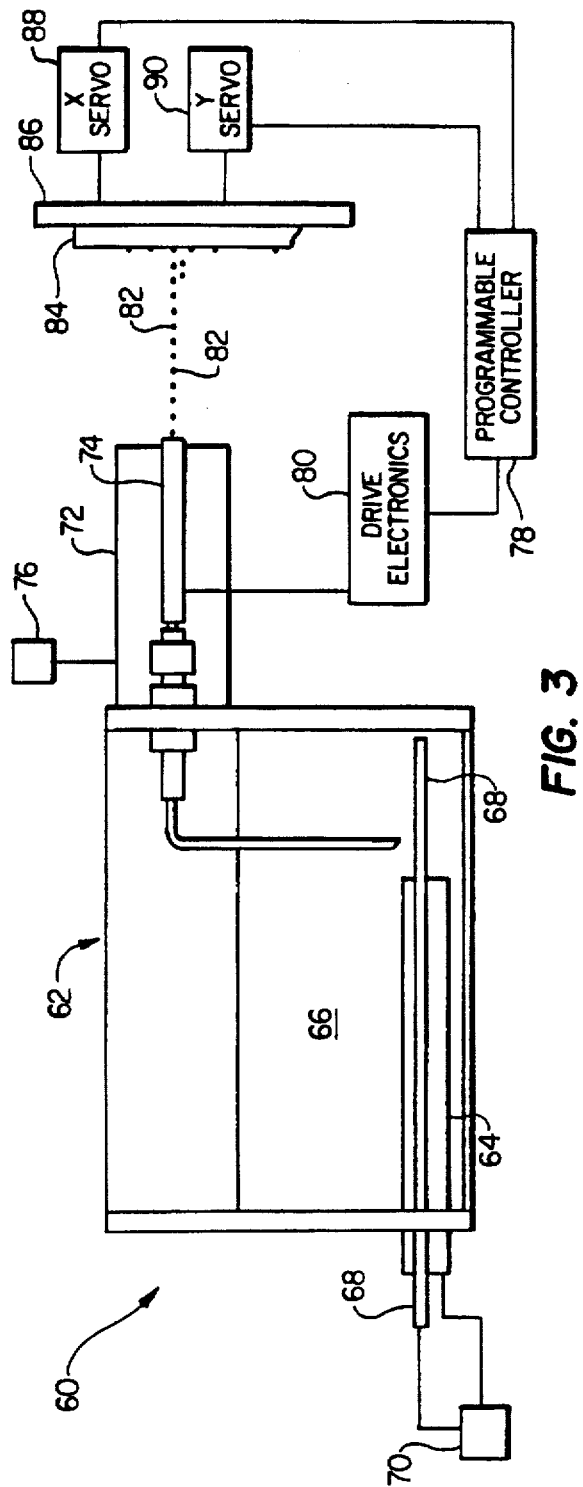
FIG. 3 is a schematic drawing of an apparatus constructed in accordance with the present invention for dispensing optical materials.

Referring to the drawings and FIG. 3 in particular, shown therein and generally designated by the reference character 60 is an optical material ejecting apparatus constructed in accordance with the present invention and which is capable of ejecting quantities of liquid optical material with great accuracy to very small areas or surfaces to be wetted.

As illustrated, the optical material ejecting apparatus 60 comprises an ejection chamber 62 which includes heating element 64 operatively positioned therein to maintain the optical material 66 in a liquid state. Heating element 64 and thermocouple 68 are connected to power source 70 so the optical material 66 will be maintained in a liquid state. Heater 72 surrounds ejection device 74 and controls the temperature of the liquid optical material 66 within the ejection device 74. Heater 72 is connected to power source 76. Programmable controller 78 provides activating signals to drive electronics 80 whose output causes ejection device 74 to eject a drop or drops 82 of liquid optical material 66 which is controlled by the particular program in programmable controller 78.

As shown in FIG. 3, the ejection device 74 comprises a drop-on-demand ejection device employed to produce drops 82 of optical material 66. The target substrate 84 could be moved by mounting target substrate 84 on an X-Y table 86 which is equipped with an X-axis positioning servo 88 and a Y-axis positioning servo 90. Programmable controller 78 is operatively connected to the X-axis positioning servo 88 and the Y-axis positioning servo 90 and is structured to provide programmed control signals thereto to move the X-Y table 86 to a particular desired location and/or a predetermined sequence of locations with respect to ejection device 74.

A system for dispensing drops of liquid optical material for forming micro-optical components utilizing an ejection head or microjet, such as those shown in FIGS. 1–3, will be referred to herein as an "optics jet droplet dispensing system". In an optics jet droplet dispensing system, a volumetric change in the liquid optical material within the ejection head 10 is induced by the application of a voltage pulse through electrical leads 32 and 34 to a driver device 26, preferably a transducer and most preferably a piezoelectric, electrostrictive, magnetostrictive or electromechanical transducer, which is directly or indirectly coupled to the liquid optical material. This volumetric change causes pressure and velocity transients to occur in the liquid optical material, and these are directed to produce a drop that issues from the orifice 18 of the ejection head 10. In a preferred embodiment, the optics jet droplet dispensing system is a "drop-on-demand" system in which the voltage is applied only when a drop is desired. A drop-on-demand system is to be distinguished from a "continuous" system in which the optics jet droplet dispensing device produces a continuous stream of charged droplets which are directed to a target by deflection plates. The drop-on-demand system of the present invention is data-driven so that single droplets or bursts of droplets ejected at frequencies up to 5 kHz may be printed at predetermined locations.

The system according to the present invention includes a microdroplet generating device with the capability of dispensing optical materials in one embodiment at a temperature up to about 300° C. and in another embodiment at a temperature up to about 1100° C., controlling atmosphere and temperature during flight and controlling precisely the position (XY) of a target substrate. The system has the capability to dispense droplets of optical materials from a drop-on-demand optics jet droplet dispensing device in one embodiment at a temperature up to about 300° C. and in another embodiment at a temperature up to about 1100° C., with systems to control the temperature gradient along the droplet flight path, and to heat or cool the target substrate in order to control surface wetting, solidification rate and curing processes.

Figure 4:
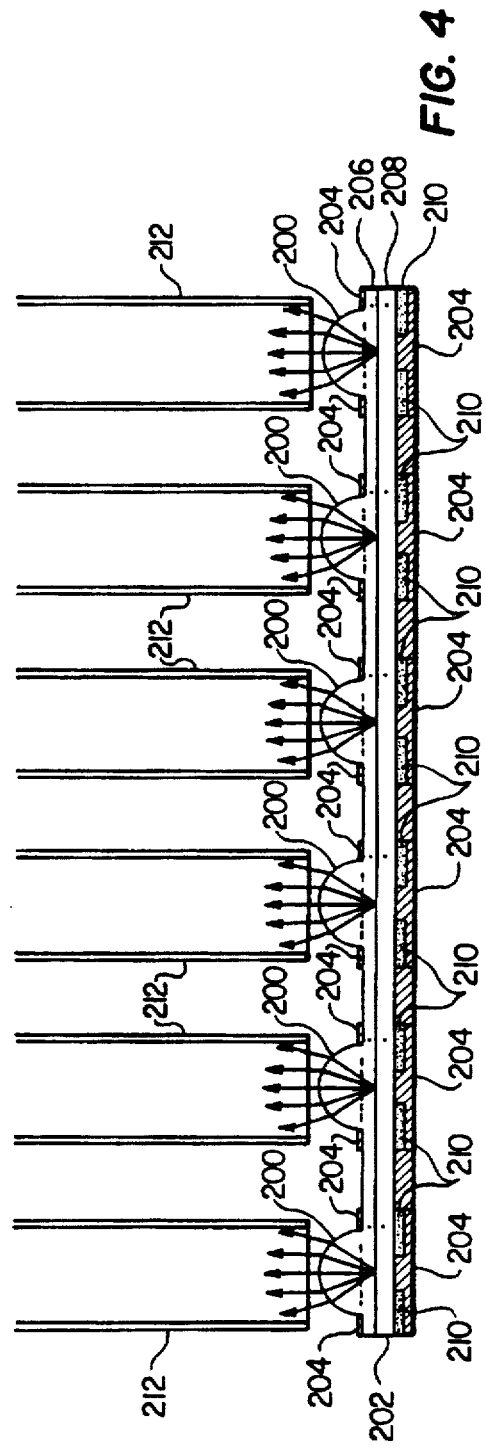
FIG. 4 is a schematic drawing of an array of micro-lenses produced according to the present invention coupling the output of an array of diode lasers into optical fibers.

According to the present invention, it has been determined that an optics jet droplet dispensing system provided with means for dispensing optical material at high temperatures and means for controlling target temperature and surface condition, is a highly versatile tool for in-situ fabrication of micro-components and systems. Such an optics jet droplet dispensing system enables direct printing onto optical substrates or active devices of a wide range of commonly used optical materials to create a variety of micro-optical components and systems including high-density arrays of circular, cylindrical or square lenslets, complex elements such as anamorphic lenslet elements, waveguides, couplers, mixers and switches, as well as monolithic lenses deposited directly onto diode lasers facets or onto the tips of optical fibers. For instance, and as shown in FIG. 4, an array of microlenses 200 can be deposited directly on an array of diode lasers 202. As those of ordinary skill will recognize, the diode lasers 202 are conventional in the art and include metal contacts 204, an N layer 206, preferably formed of a doped silicon layer, a P layer 208, and insulating blocks 210, preferably formed of silicon dioxide. The microlenses 200 deposited on the diode lasers 202 refract the output of the diode lasers 202 so that more of the output from diode lasers 202 enters a corresponding fiber optic cable 212 than would enter the fiber optic cable 212 in the absence of the microlenses 200.

Further details concerning optical material ejecting apparatus such as that shown in FIG. 3 may be found in U.S. Pat. No. 5,229,016, the entire disclosure of which is hereby incorporated by reference.

According to the method of the present invention, an optics jet droplet dispensing system utilizing an ejection head or microjet 10 such as depicted in FIGS. 1 and 2, is used to produce droplets of optical materials having a diameter ranging from about 8 µm to about 300 µm with precise volumetric control, preferably within ±2%, and delivered with micron accuracy to pre-selected target locations. According to the present invention, arrays of plano-convex lenslets, comprising optical wax on glass substrates, have been produced with densities as high as 10,000 per square centimeter.

The minimum feature size which may be printed by the optics jet droplet dispensing system of the present invention is determined by both the volume of the smallest ejectable microdroplet, as controlled by the optics jet droplet dispensing device orifice diameter, and the degree of wettability of the substrate surface to the printed material. Single or multiple droplets printed onto a flat substrate spread and coalesce to form plano-convex elements upon either or both of solidification and curing. Hemispherical lenslets of differing diameters and speeds are formed by varying the number of droplets per substrate site, the substrate condition and either or both of the type and solidification rate of the optical material used. Other types of micro-optical structures, such as cylindrical lenslets, microlens arrays and optical interconnects, may be printed by translating the substrate in the plane perpendicular to the optics jet droplet dispensing device and controlling its temperature.

Figure 5:
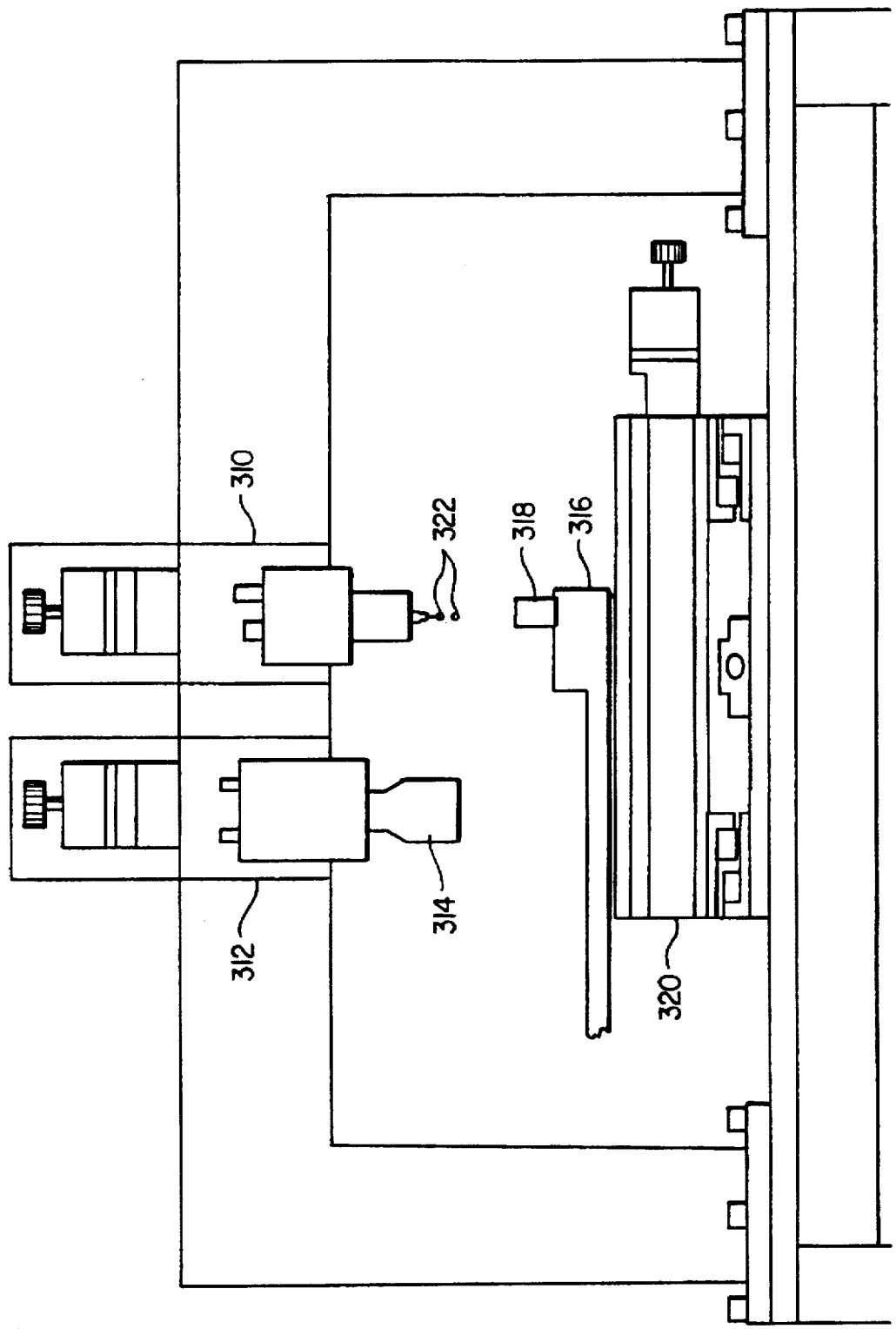
FIG. 5 is a schematic drawing of apparatus constructed in accordance with the present invention for dispensing optical materials in conjunction with a vision system.

The method of the present invention is data driven in that optics jet droplet dispensing of optical material requires data in digital format. Accordingly, data can be used directly to control the jetting which results in flexible manufacturing platforms. For instance, the method can be used to directly place or mount differently sized and configured optical circuit patterns onto a single substrate plane or onto the ends of optical fibers in an array or bundle, with the capability for real-time, design changes. Also, and as shown in FIG. 5, an optics jet dispensing system 310 of the present invention can be combined with a vision system 312 that includes focusing optics 314 so as to correct for system assembly errors. In such an arrangement, a fiber optic holder 316 holding a fiber optic bundle 318 may be located on an X-Y alignment stage 320. The X-Y alignment stage 320 can be manipulated to allow the vision system 312 to detect the precise location of the end of each fiber in the fiber optic bundle 318 and then the X-Y alignment stage 320 can be manipulated again so that the fiber optic bundle 318 is located below the optics jet dispensing system 310 which can then precisely dispense drops 322 of liquid optical material so that the drops land on the ends of the fibers in the fiber optic bundle 318, the location of which is identified by the vision system 312. The method can also be used to directly generate mask patterns for construction of semiconductor micro-optics by subsequent dry etching or ion-beam machining processes.

According to the present invention, an optics jet dispensing system can be constructed with multiple jets which would allow for the printing on the same substrate of more than one optical materials such as active and passive materials or materials with different refractive indices.

Figure 6:
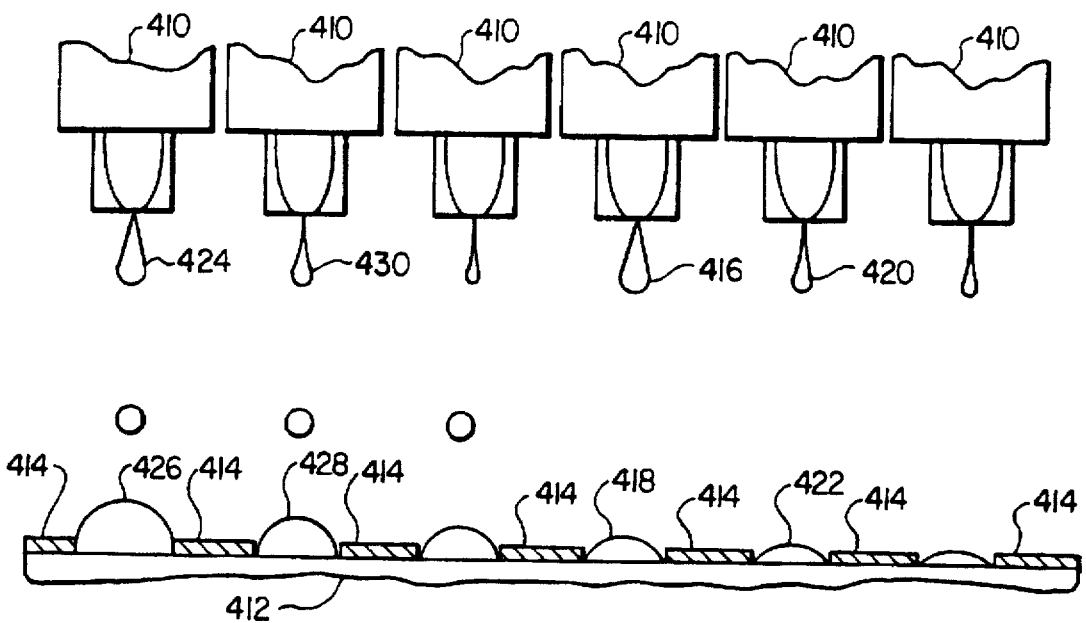
FIG. 6 is a schematic drawing of apparatus constructed in accordance with the present invention for varying the size and shape of micro-optical components.

Also according to the present invention, the size of the droplets of optical material issuing from the aperture of the ejection head can be varied. The size of the droplets can be varied by changing the data used to control the jetting of the optical material. For instance and as shown in FIG. 6, multiple ejection heads 410 are provided for dispensing drops of optical material onto a substrate 412. The substrate 412 is formed of a material that is easily wetted with the optical material being dispensed from the ejection heads 410. Prior to dispensing the drops of optical material, the substrate 412 may be masked with a non-wetting coating 414 such that only open circles of the easily wetted substrate 412 are exposed. When a drop of optical material is dispensed onto the exposed circular easily wetted portions of the substrate 412, the drop spreads out to cover the area but does not coat the non-wetting coating 414. FIG. 6 demonstrates two methods for increasing the amount of optical material dispensed onto a particular exposed circular easily wetted portion of the substrate 412. First, larger or smaller droplets can be generated by varying the shape and/or amplitude of the electrical pulse that drives the ejection devices 410. As shown in FIG. 6, a large drop 416 forms a lens shape 418 with a greater curvature and shorter focal length when compared to a smaller drop 420 and the resultant lens shape 422. Second, multiple drops 424 can be directed to the same exposed circular easily wetted portion of the substrate 412 to create a larger amount of fluid deposited, thus forming a lens shape 426 with a greater curvature and shorter focal length when compared to the lens shape 428 formed by fewer drops 430.

Also, the curvature and focal length of the deposited lens shapes can be altered by dispensing from the ejection devices multiple fluids having different characteristics. Thus, by varying the size of the droplets, the number of droplets, and by varying the contour of the lens surface depending on the contact angle between the droplet and the substrate and the wetting of the substrate, microlenses with variable focal length can be produced.

Figure 7:
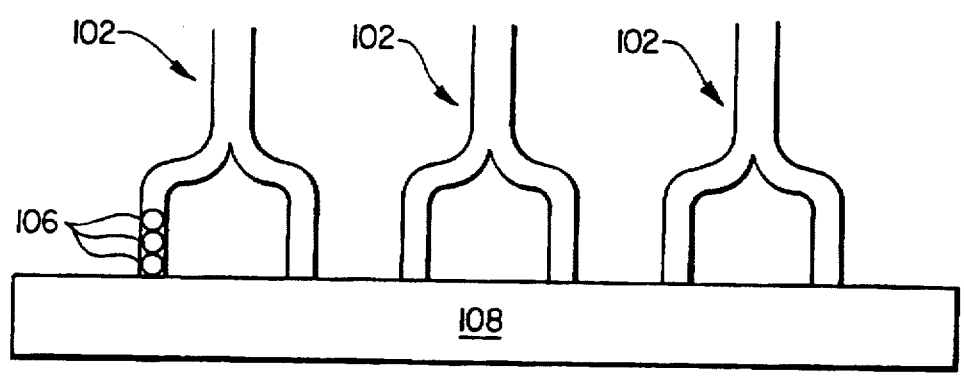
FIG. 7 is a schematic drawing of representative vertical three-dimensional structures that may be produced according to the method of the present invention.
Figure 8:
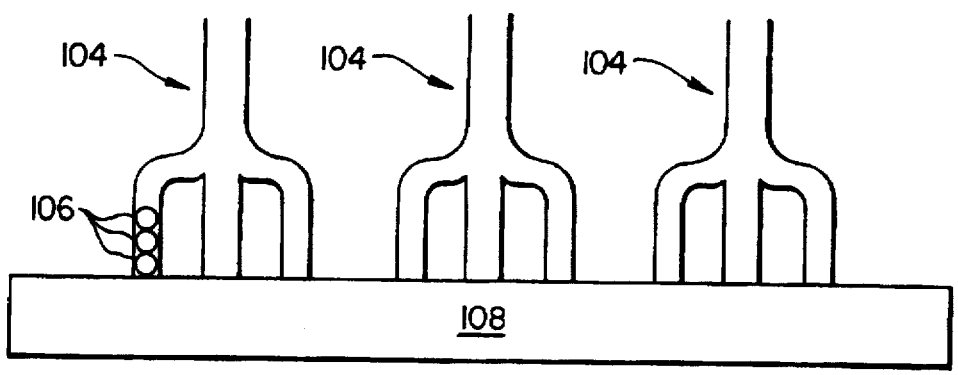
FIG. 8 is a schematic drawing of representative vertical three-dimensional structures that may be produced according to the method of the present invention.

According to the present invention, the optics jet droplet dispensing system can be used to create three dimensional structures of high aspect ratio by delivering multiple droplets of optical material to a target location. By varying the number of droplets dispensed and the scanning pattern, a wide variety of optical lenslet configurations can be created at different locations on the same substrate or system. According to the present invention and as shown in FIGS. 7 and 8, an optics jet dispensing system can be used to create three dimensional vertical structures 102 and 104, respectively, by delivering multiple droplets, shown schematically as 106, to a substrate 108.

Figure 9:
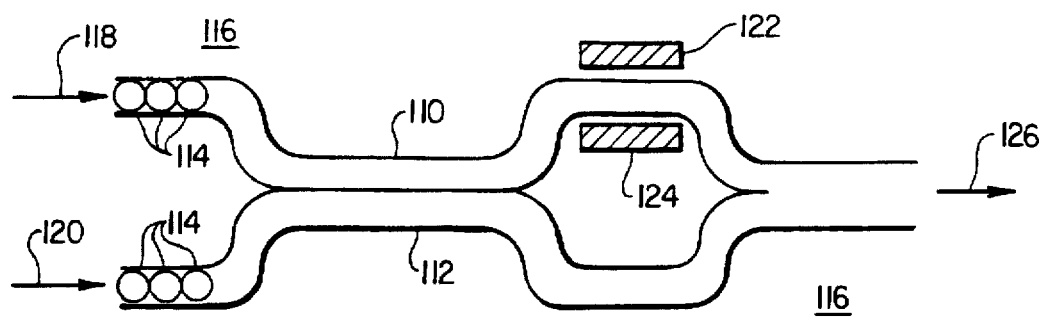
FIG. 9 is a schematic drawing of representative horizontal three-dimensional structures that may be produced according to the method of the present invention.

According to the present invention and as shown in FIG. 9, an optics jet dispensing system can be used to create three dimensional horizontal structures such as waveguides 110 and 112, by delivering multiple droplets, shown schematically as 114, to a substrate 116. The waveguides 110 and 112 receive light input 118 and 120. The light input 118 entering waveguide 110 passes through electrodes 122 and 124 which modulate the light input 118. After passing through the electrodes 122 and 124, the light input 118 is combined with light input 120 to produce light output 126.

According to the present invention, various optical materials can be dispensed as microdroplets so long as they can be formulated by heating and/or mixing with a solvent to have a viscosity of less than 40 centipoise in the ejection head of the optics jet droplet dispensing system. For instance, according to the present invention, an optics jet droplet dispensing system can be used to dispense optical materials such as waxes, greases, epoxies, various polymers including amorphous Teflon®, polyimide and photoresist and sol-gel materials at temperatures as high as 300° C. Also, by removing the driver device from the heating zone, an optics jet droplet dispensing system can be used to dispense optical materials at temperatures up to 1100° C.

According to a preferred embodiment of the present invention, the formulations of optical materials for optics jet droplet printing of micro-optics satisfy two requirements. Namely, after solidification and curing they provide both the optical and physical properties needed for the particular application. And they are reducible in viscosity below about 40 centipoise, by either heating or modifying the polymer chemistry by additions of diluents or solvents, so as to be readily printable by the method of the present invention. Solvent-free materials at elevated temperatures are preferred according to the method of the present invention since evaporation of solvent from microjetted droplets during solidification may cause size and shape distortion in the finished product.

According to a preferred embodiment of the present invention, the types of micro-optical materials to be dispensed as microdroplets include index-tuned thermoplastics and hydrocarbon resins dispensed at 100°–200° C., along with UV-curing optical adhesives microjetted at room temperature.

Figure 10:
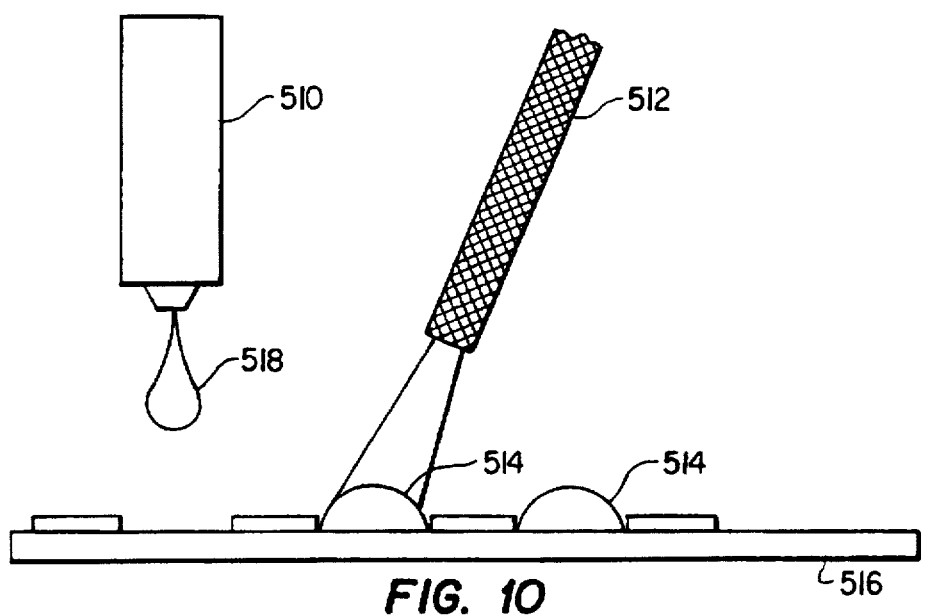
FIG. 10 is a schematic drawing of apparatus constructed in accordance with the present invention for dispensing optical materials in conjunction with a source of radiation.

According to the present invention, optical materials and the target substrate can be processed before, during and after delivery of the optical material to result in products having different characteristics. The pre-delivery processing techniques include heating, melting and dissolving the optical material as well as substrate preparations such as etching or polishing. The in-flight processing techniques include cooling, mixing and curing. The post-deposition processing techniques include heat treatment, curing, chemistry and surface finishing. For instance, as shown in FIG. 10, an optics jet droplet dispensing system 510 can be combined with a source of radiation 512, such as a UV light source or a laser beam, and the source of radiation 512 can be aligned with the optics jet droplet dispensing system 510 to cure the optical material after forming a microlens shape 514 on a substrate 516. The impact of a droplet of optical material 518 on the substrate 516 can be aligned in time and space with such a source of radiation 512. The foregoing curing technique is applicable to micro-optical elements other than microlenses.

The numerical apertures of lenslets formed by microdroplets of a given volume of optical material deposited onto a substrate depend upon its surface contact angle, the viscosity of the optical material, the rate of solidification of the optical material and the materials surrounding the site of deposition of the optical material on the substrate. The viscosity of the droplets of optical material at impact can be adjusted by varying the dispensing temperature, the cooldown rate before and after impact, for instance via an optical energy source such as UV light in the flight chamber and/or an IR laser directed at the target site, and substrate surface condition, such as wettability.

According to the method of the present invention, multiple ejection heads or microjets, such as those shown in FIGS. 1 and 2, can be used to simultaneously microdispense different materials such as active and passive materials with or without different indices of refraction. Also, multiple ejection heads or microjets with different orifice sizes can be used to simultaneously dispense different sized droplets of optical material. Finally, multiple ejection heads or microjets can be used to mix different materials, such as the components of a compound optical material, in flight or at the substrate target.

In order to be dispensed from an ejection head or microjet according to the present invention, an optical material must have a viscosity less than about 40 centipoise as it exits the orifice of the ejection head or microjet. The temperature of optical materials having a higher pre-cure viscosity may be elevated to bring their viscosities into an acceptable range for dispensing from an ejection head. Table I lists various types of materials which are of interest for microoptics, along with the approximate temperature to which each must be raised to achieve the range of viscosity needed for dispensing as microdroplets.

TABLE I

Optical Materials for Microdroplet Dispensing, with approximate Dispensing Temperature

| Material Type | Dispensing Temperature (°C.) |
| --- | --- |
| Polymers (photoresist, Teflon ®) | <100 |
| Sol-gels | <50 |
| Optical waxes | <120 |
| Optical epoxies | 80–100 |
| UV-curable resins & adhesives | 100–150 |
| Polymers with active materials (dyes) | <100 |
| Optical plastics | 100–500 |
| Optical glasses | 600–1100 |

According to the method of the present invention, optical wax at 100° C. was jetted onto a glass slide to form an array of 80 µm plano-convex lenslets on 100 µm centers.

The suitability of an optical material for use in the method of the present invention is assessed according to the following protocol:

(a) Viscosity data as a function of temperature to determine the optimal temperature for dispensing droplets of an optical material is obtained;

(b) The optimum drive waveform, voltage, and frequency for microdispensing an optical material from an optics jet droplet dispensing system is determined and single droplets and bursts of multiple droplets are dispensed at different locations on optical substrates for testing and evaluation;

(c) Electron and optical microscopy is used to inspect the deposited droplets of dispensed material for defects such as second phases and microcracks, and to measure their dimensional characteristics;

(d) The dispensing parameters are varied such as in-flight cool down rate, dispenser device temperature, substrate temperature, and firing frequency (for droplet bursts) to optimize the uniformity of the deposited material;

(e) The visible light transmission and focal length ranges of the most uniform deposits are measured, using a calibrated detector and beam profiler to enable quantitative comparisons among various optical materials;

(f) Compare the lenslet formed from an optical material to lenslets formed from other optical materials based on considerations such as maximum refractive index, coupling efficiencies and numerical apertures, along with minimum lens dimensions.

Figure 11:
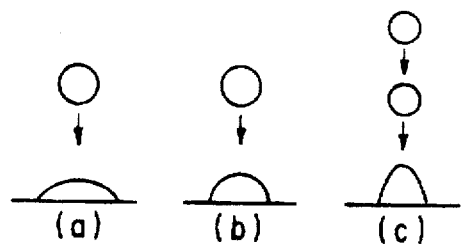
FIG. 11 is a schematic representation of the variation in plano-convex microlenslets created by microdroplets of fixed volume by variation of certain process parameters.

According to the present invention, the ranges in lenslet and lenslet-array design parameters can be determined without impacting adversely the optical quality or efficiency of the lenses by manipulation of the microdroplet deposition process parameters. As shown in FIG. 11, the focal lengths and numerical apertures of plano-convex lenslets formed by droplets of a given optical material that is deposited onto a substrate can be varied by changing such parameters as the number of droplets per site, the viscosity of the droplet material, as well as the condition, treatment or temperature of the substrate surface. Therefore, the numerical apertures of a lenslet formed from droplets from an optics jet droplet dispensing device with a certain orifice diameter can be increased by reducing the wettability of the substrate surface, increasing the viscosity of the droplet at the moment of impact (for instance by cooling it in flight) or by depositing one or more additional droplets on the top of the first droplet after it is partially solidified.

Specifically, FIG. 11(a) is a schematic representation of the profile of a lenslet produced under the following process parameters: single droplet, low viscosity, hot substrate and high-wetting surface. FIG. 11(b) is a schematic representation of the profile of a lenslet produced under the following process parameters: single droplet, higher viscosity, cool substrate, and low-wetting surface. FIG. 11(c) is a schematic representation of the profile of a lenslet produced under the following process parameters: multiple droplets, cool substrate, and low-wetting surface. The lenslets shown in FIG. 11 are made from the same optical material and the lenslet of FIG. 11(a) has a lower numerical aperture than the lenslet of FIG. 11(b) which in turn has a lower numerical aperture than the lenslet shown in FIG. 11(c).

According to the present invention, the effectiveness of the jetted microlenses has also been determined for use in very fast lens applications such as collimating light emitted from the narrow aperture of a diode laser or an optical fiber. For free space operation, the focal length of a plano-convex spherical lens with radius R made from a material with an index of refraction n is f=R/(n−1). For light of wavelength λ diffracting from an aperture of diameter a, the collimating radius of curvature $R_c$ is found from ray tracing through a thick lens of approximate height h. Using geometrical considerations, $R_c$ may be related to the height h and the lens diameter c. Thus, the aperture is a function of h and c, which constitute lens fabrication parameters and over which there is precise control. Specifically, $$a = \left\{ \frac{2\lambda}{h(n-1)} \left[ \frac{(2-n)}{2n} h^2 + \frac{c^2}{8} \right] \right\}^{1/2}$$

Figure 12:
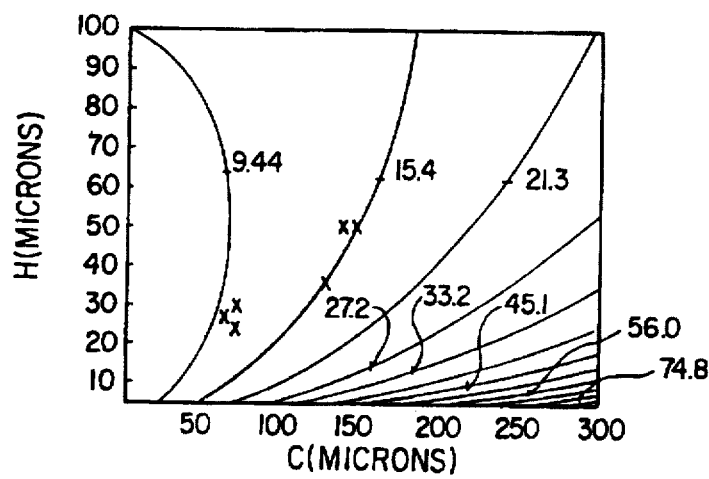
FIG. 12 is a plot of design curves for fabricating microlenses which collimate.

A moderate requirement is that c be greater than a. This equation is plotted as an engineering contour plot in FIG. 12 for n=1.3 and a wavelength of 500 nm. This plot can be interpreted to find the contour corresponding to a given aperture. The axes then give the range of specifications for the collimating lens. The parameters measured for several optical wax lenslet arrays that were made and tested according to the present invention are marked with X's on the plot and show apertures in the 9–15 µm range, which indicates that collimating apertures in the 5–100 µm range can be made by the process of the present invention using practical values of c and h. These aperture dimensions correspond to single and multimode fibers, and to narrow and wide stripe diode lasers and amplifiers.

The ranges in focal length .and numerical apertures which can be obtained with nearly spherical plano-convex lenslets made using the optics jet droplet dispensing process for a particular optical material can be determined by:

(a) increasing the number of droplets deposited at the same site and allowing each droplet to solidify at its substrate-contacting surface before placing the next drop on top of it; and (b) decreasing the wettability of the substrate deposition site prior to placement of the first droplet by, for example, polishing or cleaning the entire substrate surface, or roughening by laser etching only the sites to be covered by the lenslets.

The varieties of useful configurations of nearly cylindrical and anamorphic microlenslets for use in focusing or collimating, shaping and steering beams, for example, in diode laser and amplifier systems, can be determined by:

(a) translating the substrate stage during droplet deposition;

(b) coordinating droplet emission frequency with substrate speed; and (c) controlling substrate surface condition, temperature and cooling rate.

The highest densities of arrays of microlenses with properties which can be used for diode laser array coupling applications can be determined by:

(a) ejecting droplets of optical fluids less than 25 microns in diameter by reducing the microjet orifice diameter to less than 20 microns; and (b) varying substrate surface wettability and/or viscosity of dispensed formulations to obtain lenslets with shallow features and low numerical apertures for diffraction, deep features and high numerical apertures for refraction applications.

Scanning electron microscope (SEM) studies and optical characterization measurements can be performed on the above lenslet configurations to determine the values of key performance parameters achieved by the process of the present invention to determine the best lenslets for incorporation into optical systems and substrates.

The process of the present invention can be used to deposit focusing or collimating lenslets onto the outlet facets of both edge-emitting and surface-emitting diode lasers.

The advantages of the method of the present invention for making and mounting microlenses for collecting, collimating and focusing diode laser output beams include:

(a) the capability to deposit lenslets directly onto the emitting facet of a diode, thereby providing greater control over beam divergence than proximity lenslets; and (b) lower production cost and greater flexibility in lens formation compared to thin film deposition and etching methods.

According to this process, lenslets are deposited onto test diode lasers and then the diode-lenslet systems are tested for optical performance.

Figure 13:
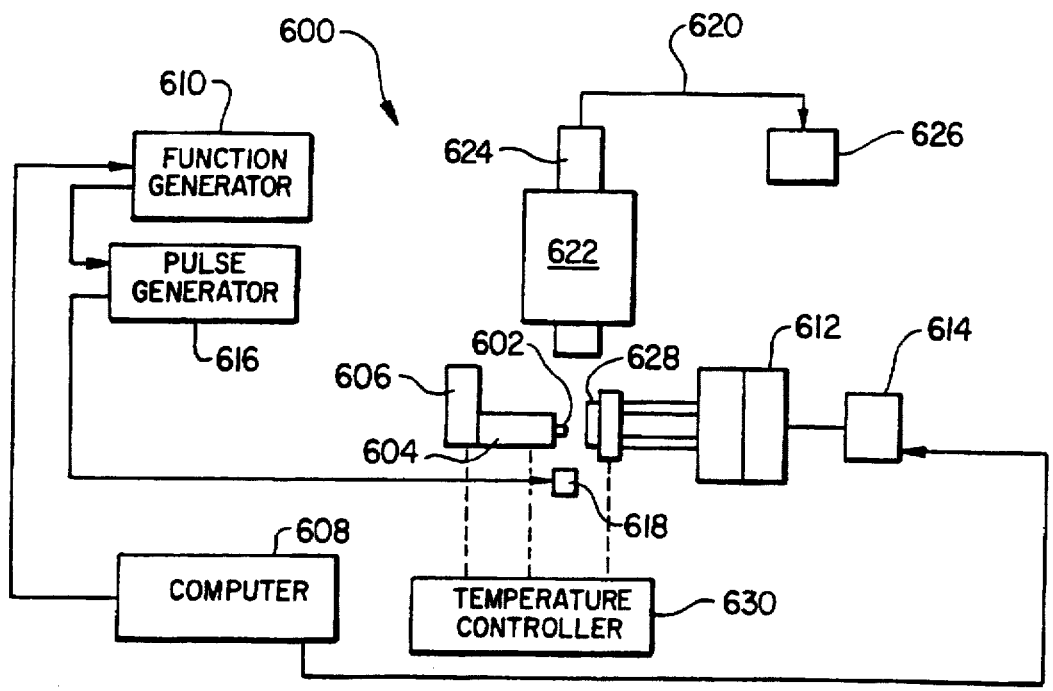
FIG. 13 is a schematic drawing of an apparatus constructed in accordance with the present invention for dispensing optical material.

A schematic diagram of a micro-optics printing station according to the present invention is generally designated in FIG. 13 by the reference numeral 600. A microjet printhead 602 having a 5 µm mesh filter, preferably formed of stainless steel, is contained within a heating shell 604 which is connected to a heated fluid reservoir 606. A computer 608 controls a function generator 610 which in turn produces the printhead drive waveform and the motion of the XY-stage 612 which is driven by the X-Y stage driver 614. The computer also sets all of the microjet printing parameters. A pulse generator 616, triggered by the function generator 610, drives an LED 618 positioned below the orifice of the printhead 602 to provide stroboscopic illumination of the superimposed images of the ejected microdroplets during pre-printing microjetting parameter optimization. The superimposed images are viewable with a vision system 620 comprising a microscope 622, a camera 624 and a television 626. The temperatures of the fluid reservoir 606, printhead 602 and substrate 628 are independently regulated by the temperature controller 630 to control fluid viscosity at the orifice of the printhead 602 and printed microdroplet solidification rate.

The micro-optics printing process according to the apparatus shown in FIG. 13 involves: (i) adjusting the temperature of the printhead 602 and the parameters of the drive waveform to achieve stable microdroplet formation with the particular optical material to be printed, (ii) setting the surface condition and temperature of the substrate 628 for optimal micro-optical element formation, then (iii) specifying the specific pattern of print sites and the number of microdroplets to be printed per site. According to this process, cleaning of the substrate 628 is an important step in the process and the surface of the substrate 628 may or may not be treated with a low-wetting coating to inhibit or encourage, respectively, droplet spreading and coalescence prior to solidification.

Figure 14:
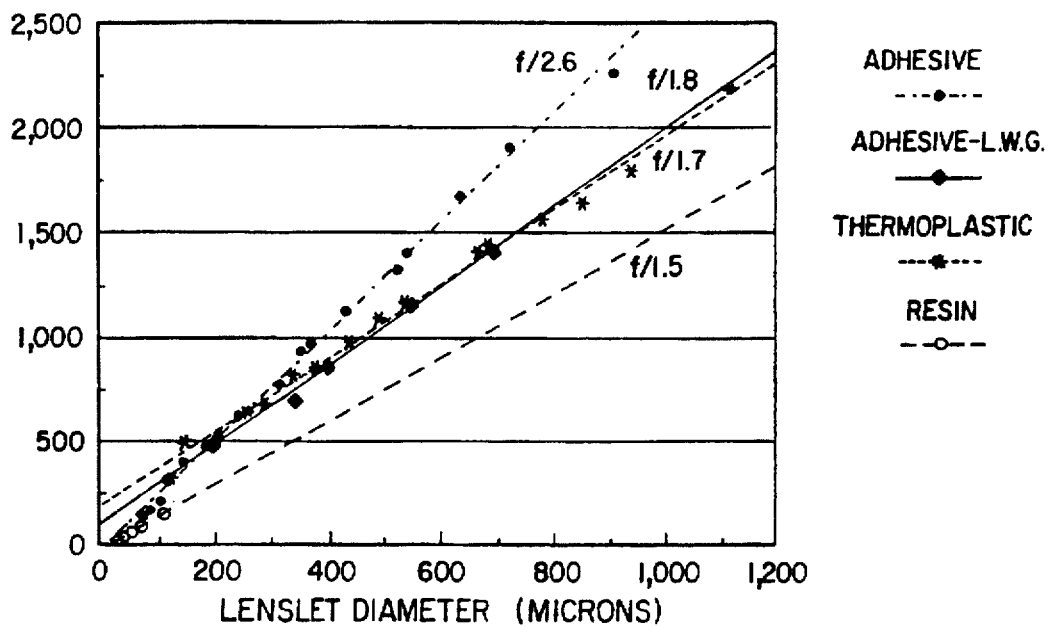
FIG. 14 is a plot of printed hemispherical lenslet focal length versus lenslet diameter.

Plano-convex spherical microlenses can be fabricated according to the method of the present invention by microjetting microdroplets of materials such as optical adhesive material at room temperature or optical thermoplastic formulations at elevated temperatures onto substrates such as glass slides, silicon wafers and the tips of optical fibers, and then solidifying the droplets by UV-curing or cooling, respectively. According to this process, the diameter of the lenslets is determined primarily by the size and number of microdroplets deposited, and the speed of a microlens of a given diameter depends on the droplet surface tension and the wettability of the substrate to the material being deposited. This is illustrated in FIG. 14 which is a plot of focal length versus lenslet diameter for microlenses of low-index ($n_D$=1.53) optical adhesive, high-index ($n_D$=1.704) thermoplastic material and high melting point resin, dispensed at 25° C., 145° C. and 200° C., respectively. All of the lenslets were printed onto virgin (untreated) glass slides except for one set of the solvent-bearing adhesive microlenses wherein the glass was pre-treated for low wetting (designated as "ADHESIVE-L.W.G."). In all cases and as shown in FIG. 14, focal length varies linearly with diameter, while lenslet speed, as determined by line slope varies independently of diameter with lenslet material and substrate surface condition. Lenslet speed varies by nearly a factor of two over the range f/1.5 to f/2.6 by changing the microjetted material and substrate surface preparation. For example, a 30% increase in speed can be obtained with the optical adhesive by reducing the wettability of the glass substrate.

Figure 15:
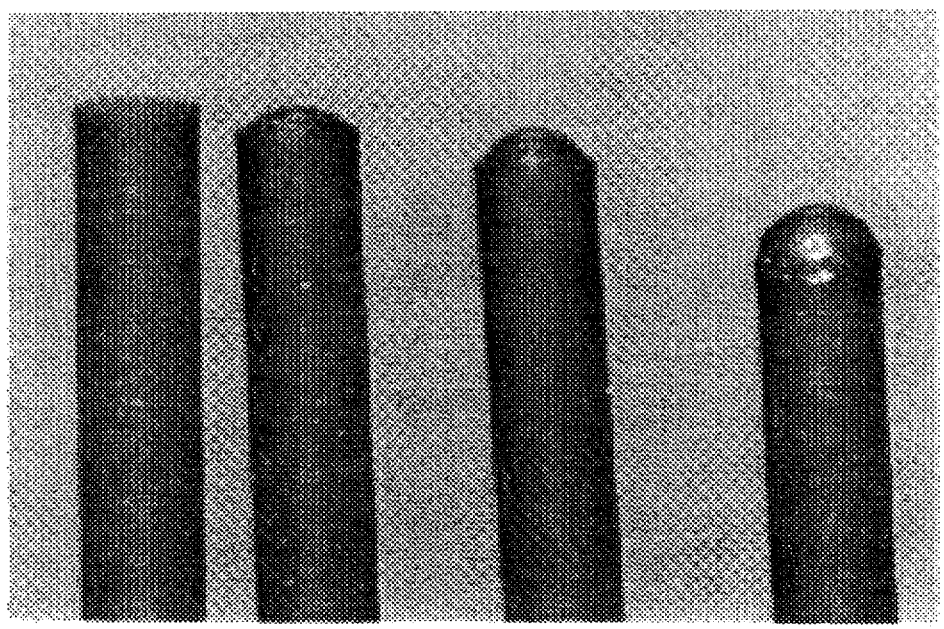
FIG. 15 is an optical micrograph of a portion of a 50×50 array of 107 μm diameter lenslets on 125 μm centers printed onto a glass substrate.

According to the method of the present invention a 50×50 array of 107 μm diameter lenslets on 125 μm centers was printed onto a glass substrate treated with a silicone formulation for low surface wetting, by dispensing 50 μm droplets of a 2:1 mixture of Norland Products #71 optical adhesive and acetone at room temperature and then curing the structure under UV illumination. An optical micrograph of a portion of the array is shown in FIG. 15. Microscopic measurements at 100X of lenslets selected at random over the entire array indicated a standard deviation in diameter of 2 μm. A far-field diffraction pattern under back-illumination with collimated light showed good uniformity and clarity which indicated good lenslet formation, optical quality and placement for the array.

Figure 16:
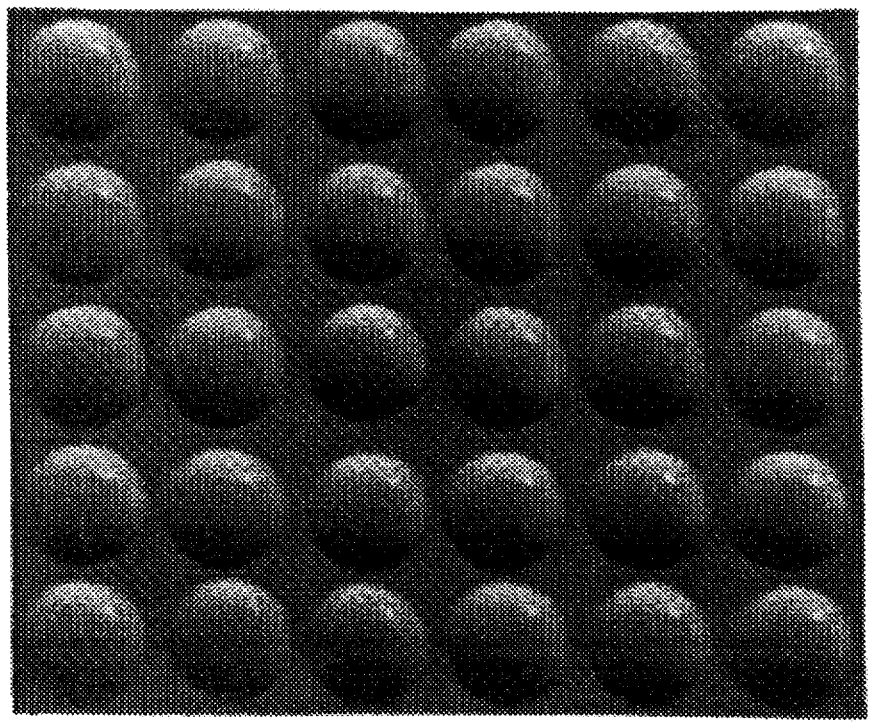
FIG. 16 is an optical micrograph of four 300 μm fibers, one with only a polished tip and three with printed lenslets.

According to the method of the present invention, hemispherical lenslets were printed directly onto the polished tips of optical fibers. When printing lenslets onto such optical fibers, the diameter of the lenslets is constrained by the fiber width but the radius of curvature of the lenslets may be tailored over a wide range by varying the number of deposited microdroplets. For instance, a lenslet radius of curvature range of 150 to 300 μm was achieved by depositing onto the polished tip of a 300 μm fiber by increasing the number of 57 μm deposited droplets from 100 to 200. FIG. 16 is an optical micrograph of four 300 μm fibers, one with only a polished tip and three with printed lenslets. According to the method of the present invention, lenslets can be printed directly onto the unpolished tips of optical fibers when the polymer formulations have an index of refraction that matches the index of refraction of the optical fiber.

Figure 17:
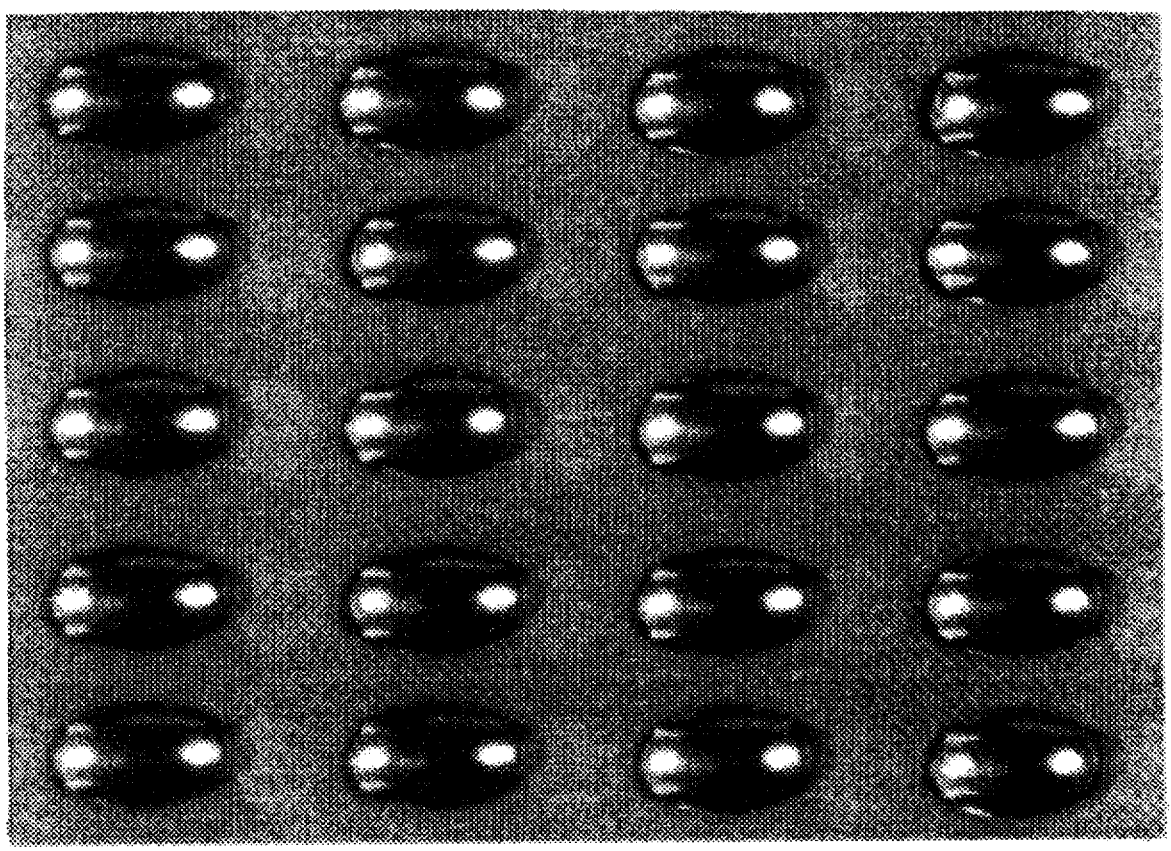
FIG. 17 is an optical micrograph of a portion of an array of elliptical plano-convex microlenses.

According to the method of the present invention, planoconvex microlenses have been fabricated from thermoplastic formulations by placing adjacent microdroplets at spacings which enable them to coalesce into a single elliptical droplet prior to solidification. Specifically, each lenslet in a 20×30 array of cylindrical microlenses was formed by microjetting four 50 μm droplets of 1.704 index thermoplastic at 145° C. onto a glass substrate maintained at 45° C., at droplet to droplet spacings of 75 μm. An optical micrograph of a portion of the array is shown in FIG. 17. The microlenses had a size of 304 μm×196 μm and were very reproducible, varying in major and minor axis dimension over the entire array by standard deviations of less than 4 μm. The overall size and length/width aspect ratio of the elliptical lenslets, along with placement positions, can be tailored to match a particular application or to add value to an electro-optical device. For instance, the elliptical lenslets were used to increase the efficiency of coupling the output of edge-emitting diode laser arrays to an optical fiber or the end of a solid-state laser rod, by varying the printing process parameters. The regularity and uniformity of the far-field diffraction pattern of such an array attested to the overall good optical quality of the array.

According to the process of the present invention, ten channel waveguides having a ridge configuration with a cylindrical cross-section were microjet printed. These waveguides can be used in applications such as multimode board-to-board, backplane interconnects. Specifically, an array of 18 mm long and 134 μm wide cylindrical waveguides of high-index ($n_D$=1.704) thermoplastic was formed on glass slides ($n_D$=1.53). Each waveguide was formed by dispensing 250 each 50 μm droplets at 145° C. onto a 45° C. glass substrate on 75 μm centers, where they coalesced prior to solidification to form very uniform and straight lines. The process for printing the waveguides was similar to the process for fabricating elliptical microlenses and gave a standard deviation in width over the entire length all ten waveguides of about 2 μm.

Figure 18:
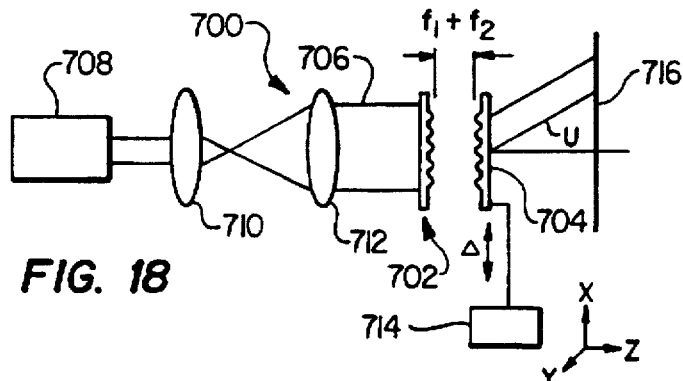
FIG. 18 is a schematic of an apparatus for agile beam steering.

The small sizes and short focal lengths achievable with microlenses can be utilized for agile beam steering, because large angular changes in beam propagation direction can arise from very small displacements in lenslet position. To demonstrate this property of micro-optics, a telescope was fabricated with micro-jet printed refractive microlens arrays, using the apparatus shown schematically as 700 in FIG. 18, and scan angle as a function of decentering of a first array 702 relative to a second array 704 was measured. A beam 706 from a HeNe laser 708 was expanded by a factor of 30 by a beam expander 710 and recollimated using a standard Galilean telescope 712. A micropositioner 714 was used to set the spacing of the two arrays 702 and 704, oriented face-to-face, equal to the sum of their focal lengths and to translate the second array 704 relative to the first array 702 in the transverse plane. Steering agility was obtained by measuring the displacement of the center of the far-field pattern 716 as a function of array translation.

Figure 19:
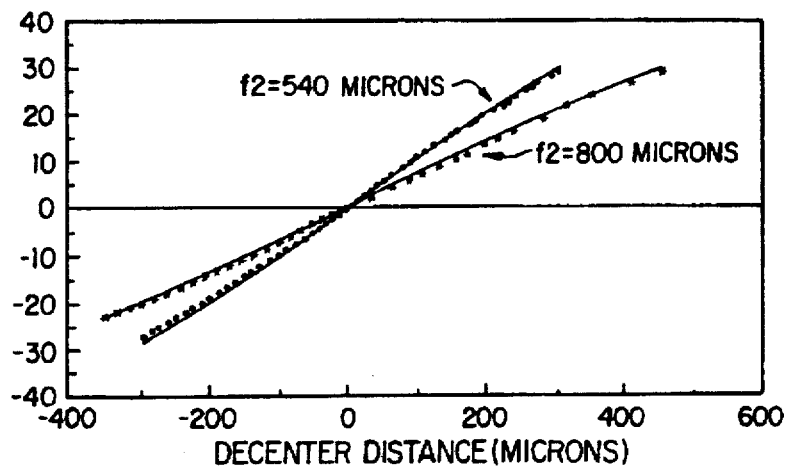
FIG. 19 is a plot of beam steering angle versus decentered distance for the apparatus shown schematically in FIG. 18.

The arrays 702 and 704 consisted of 20×20 spherical plano-convex lenslets, printed with UV-curing optical adhesive on 700 μm centers onto low-wetting glass substrates. The lenses of the first array 702 in the optical path were 530 μm in diameter and had a focal length of 720 μm. Two arrays 702 and 704 were used in the scanner position having lenslet diameter and focal length of 530 μm and 800 μm; and 440 μm and 540 μm, respectively. The data for these two configurations are shown in FIG. 19 which is a plot of beam steering angle versus array decenter distance. The data followed the expected governing relationship among the scan angle μ, the focal length f2 of the decentered array and the decenter distance Δ where Δ is determined according to the following formula: $\tan(\mu)=\Delta/f2$. As shown by FIG. 19, an array of fast (f/1.2) 500 μm focal length lenses decentered by only 100 μm produced a scan angle of 11 degrees and a total scan of about 40 degrees was achieved with a nearly linear relationship between steering angle and array decenter.

The methods of the present invention are quite advantageous for certain applications in that they provide low cost (no photolithographic masks and minimal usage of optical materials), manufacturing flexibility (data-driven), in situ, non-planar processing (direct writing, non-contact) and the ability to create new micro-optical structures such as arrays of lenslets of differing shapes and speeds in the same array.

Figure 20:
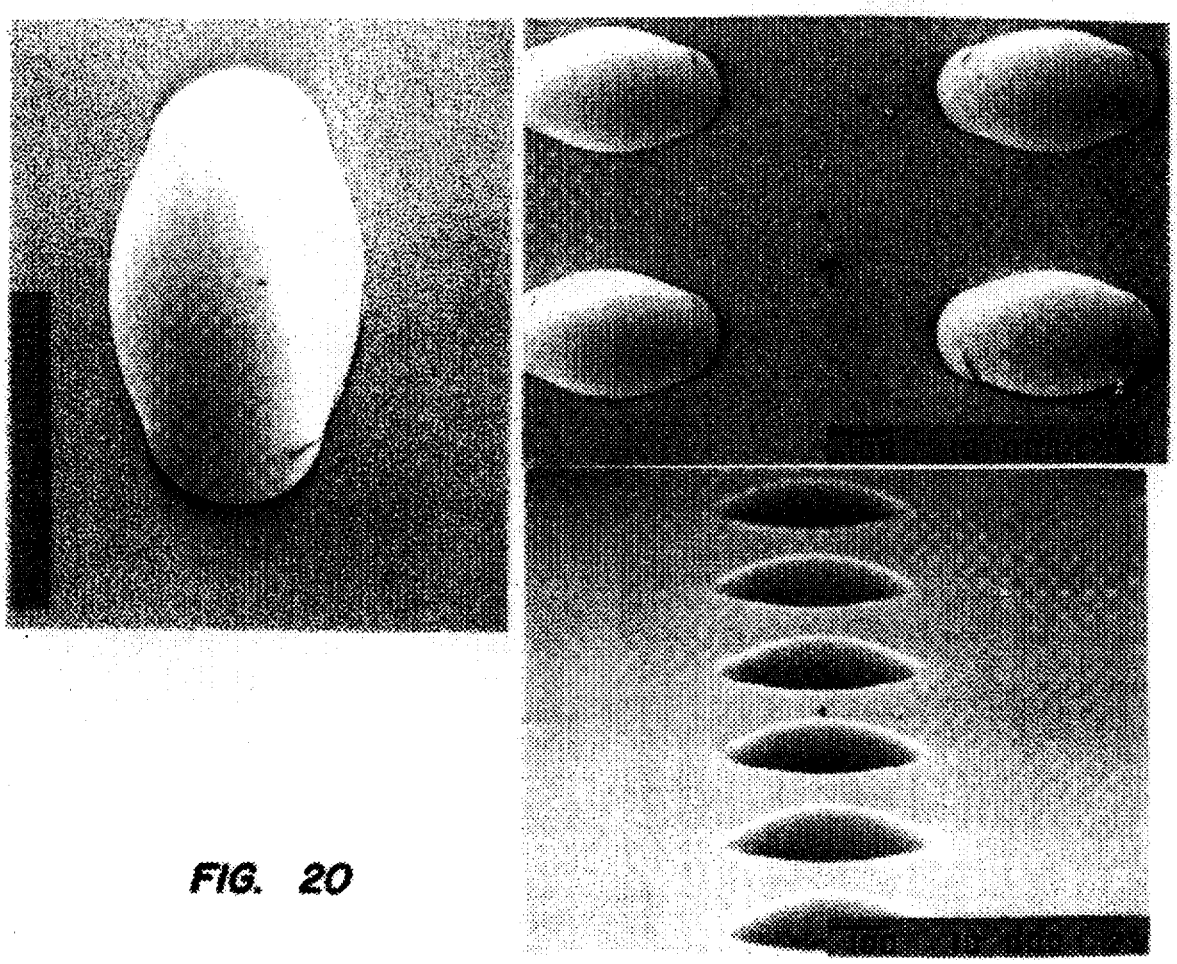
FIG. 20 is a scanning electron microscope (SEM) micrograph of a portion of an array of hemi-elliptical microlenses.

According to the method of the present invention, planoconvex, hemi-elliptical microlenses were fabricated by the microdispensing of individual microdroplets of an optical thermoplastic at a temperature substantially above the melting point of the material onto a clean, defect-free optical substrate maintained at a temperature below the melting point, in such a fashion that the droplets partially coalesce immediately before they solidify by cooling to the substrate temperature. The size and shape (major and minor axes and their respective radii of curvature) of the microlenses can be varied by changing such parameters as: material formulation, droplet size, number of droplets deposited, droplet spacing, temperature differential between microjetted material and substrate and the substrate surface wettability. FIG. 20 shows a scanning electron microscope (SEM) micrograph of a portion of an array of microjet printed hemi-elliptical microlenses that were fabricated by microjetting four overlapping droplets of an optical thermoplastic onto a glass substrate. The microlenses have a major/minor axis ratio of 1.7 and a radius of curvature along the major axis of about 330 μm.

The plano-convex refractive microlenses having the shape of a hemi-ellipsoid of revolution that were prepared according to the method of the present invention, are capable of collecting the anisotropically diverging light from an edge-emitting diode laser to bring it to a single focal point, for coupling into an optical fiber or the end of a solid state laser rod. An array of such microlenses, appropriately sized and positioned, is of great benefit in increasing the efficiency of coupling or arrays of power diode lasers to optical fibers or laser rods, particularly since the microlenses can be fabricated in situ and customized by changing the input data, in order to optimize the coupling performance of each individual system.

According to the method of the present invention, plano-convex rectangular microlenses with uniformly domed tops were fabricated according to the same general method as described above for elliptical microlenses, except that the microdroplets for each lenslet were deposited on the target substrate as two dimensional arrays instead of along a line. The size and shape of the microlenses are determined by the numbers of overlapping microdroplets deposited along the two perpendicular directions in the substrate plane along with the other process control parameters set forth above with respect to the elliptical microlenses.

The plano-convex microlenses produced according to the present invention, have a rectangular shape and a uniformly domed top and are useful in high fill-factor stand alone arrays to maximize light collection efficiency from a variety of sources. Such microlenses are ideally suited for maximizing the efficiency of light collection by CCD arrays, as the microlenses can be appropriately sized and formed on each individual pixel surface.

Figure 21:
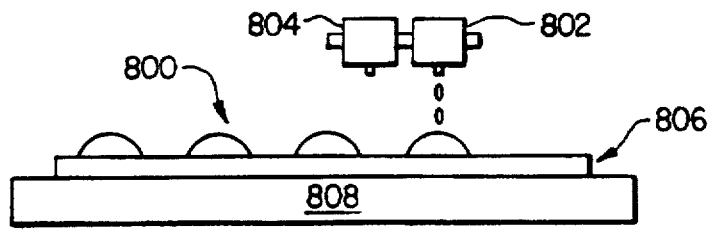
FIG. 21 is a schematic diagram of a process for fabricating compound microlenses and cladded wave guides.
Figure 21:
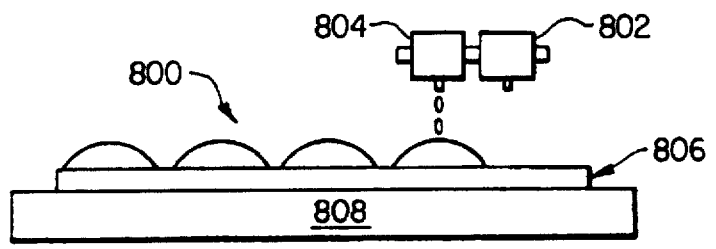

According to another method of the present invention, compound microlenses and cladded multimode waveguides can be fabricated to improve optical performance. As shown in FIG. 21, the process for fabricating a compound microlens array shown generally at 800 involves printing on an optical substrate 806 which in turn is disposed over a translatable temperature controlled XY stage 808, a desired pattern of micro-optical elements using, for example, a high index thermoplastic formulation in a first jet 802 and then repeating the identical pattern with a lower index formulation in a second jet 804. To print cladded waveguides, the XY stage would be translated normal to the plane of FIG. 21 during each deposition step in order to microdeposit adjacent, coalescing droplets along the desired waveguide direction, thereby creating ridge channel waveguides of hemi-cylindrical cross-section. The critical parameters for fabricating compound microlenses and cladded multimode waveguides include the use of optimal amounts of compatible optical materials for the micro-optical elements and the maintenance of precise substrate registration relative to the printhead during the process.

While the present invention has been described with reference to a presently preferred embodiment, it will be appreciated by those of ordinary skill in the art that various modifications, changes, alternatives and variations may be made therein without departing from the spirit and scope thereof as defined in the appended claims.

What is claimed is:

1. A method for producing micro-optical components, comprising the steps of:
   (a) maintaining an optical element forming material in a liquid state in an ejection chamber;
   (b) transferring said liquid optical element forming material from said ejection chamber to an ejection device;
   (c) maintaining said optical element forming material in a liquid state in said ejection device, said optical element forming material having a viscosity of less than 20 centipoise at a temperature of from 100° to 200° C. in said ejection device; and
   (d) ejecting drops of said liquid optical element forming material from said ejection device to a surface to be wetted.

2. A method for producing micro-optical components, comprising the steps of:
   (a) maintaining an optical element forming material in a liquid state in an ejection chamber;
   (b) transferring said liquid optical element forming material from said ejection chamber to an ejection device; and
   (c) ejecting drops of said liquid optical element forming material from said ejection device to a surface to be wetted
   wherein said surface to be wetted comprises an end of an optical fiber, wherein said optical fiber has a diameter of from 50 to 300 μm and wherein multiple drops of said optical element forming material are deposited on said end of said optical fiber to produce a microlens having a radius of curvature that varies with the number of drops of said optical element forming material deposited.

3. A method for producing micro-optical components, comprising the steps of:
   (a) maintaining an optical element forming material in a liquid state in an ejection chamber;
   (b) transferring said liquid optical element forming material from said ejection chamber to an election device; and
   (c) ejecting drops of said liquid optical element forming material from said election device to a surface to be wetted, wherein said micro-optical components are plano-convex microlenses and wherein adjacent drops of said liquid optical element forming material ejected from said ejection device to said surface to be wetted coalesce into a single elliptical droplet prior to solidification to form a plano-convex hemi-elliptical microlens.

4. A method according to claim 3 wherein the shape of said plano-convex, hemi-elliptical microlens may be adjusted by adjusting the formulation of said optical element forming material, the size of said drops, the number of drops deposited, the spacing of said drop on said surface to be wetted, the temperature differential between said ejected optical element forming material and said surface to be wetted, and the wettability of said surface to be wetted.

* * * * *

UNITED STATES PATENT AND TRADEMARK OFFICE
CERTIFICATE OF CORRECTION

PATENT NO. : 5,707,684
DATED : January 13, 1998
INVENTOR(S) : Donald J. Hayes; W. Royall Cox It is certified that error appears in the above-indentified patent and that said Letters Patent is hereby corrected as shown below:

Col. 16, line 43, replace "election" with --ejection--.
Col. 16, line 46, replace "election" with --ejection--.

Signed and Sealed this

Twenty-first Day of April, 1998

Attest:

BRUCE LEHMAN

*Attesting Officer*               *Commissioner of Patents and Trademarks*